US011590681B2

(12) United States Patent
Esswein et al.

(10) Patent No.: US 11,590,681 B2
(45) Date of Patent: Feb. 28, 2023

(54) FIN BLOCK WITH CONTINUOUSLY VARIED FIN WIDTH

(71) Applicant: KRAUSSMAFFEI TECHNOLOGIES GMBH, Munich (DE)

(72) Inventors: Michael Esswein, Fahrenzhausen (DE); Walter Breuning, Bergkirchen (DE); Stefan Buhl, Dachau (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/434,364

(22) PCT Filed: Feb. 11, 2020

(86) PCT No.: PCT/EP2020/053502
§ 371 (c)(1),
(2) Date: Aug. 26, 2021

(87) PCT Pub. No.: WO2020/187488
PCT Pub. Date: Sep. 24, 2020

(65) Prior Publication Data
US 2022/0134628 A1 May 5, 2022

(30) Foreign Application Priority Data

Mar. 21, 2019 (DE) ...................... 10 2019 002 008.1

(51) Int. Cl.
*B29C 48/90* (2019.01)
*B33Y 80/00* (2015.01)
(Continued)

(52) U.S. Cl.
CPC .......... *B29C 48/908* (2019.02); *B29C 48/903* (2019.02); *B29C 48/904* (2019.02);
(Continued)

(58) Field of Classification Search
None
See application file for complete search history.

(56) References Cited

U.S. PATENT DOCUMENTS 7,112,047 B2 9/2006 Schmuhl et al.
7,293,975 B2 11/2007 Stieglitz
(Continued)

FOREIGN PATENT DOCUMENTS

DE 19843340 C2 4/2000
DE 10315125 B3 9/2004
(Continued)

OTHER PUBLICATIONS

International Search Report for International Application No. PCT/EP2020/053502 dated May 25, 2020, 5 pages.
(Continued)

*Primary Examiner* — Mohammad M Ameen
(74) *Attorney, Agent, or Firm* — Pearne & Gordon LLP (57) ABSTRACT

A fin block is provided for a calibrating device for the calibrating of an extruded profile. The fin block includes a fin structure, which has a plurality of fins which are spaced apart from one another by grooves and are arranged in longitudinal direction of the fin block, wherein the fins of the fin structure have a variable dimension in longitudinal direction of the fin block. Further, there is provided a method for the production of the above-mentioned fin block and a calibrating device, which includes a plurality of the above-mentioned fin blocks. Furthermore, there is provided a system for the additive manufacture of the above-mentioned fin block, a corresponding computer program and corresponding data set.

14 Claims, 6 Drawing Sheets

(51) Int. Cl.
B29C 64/386 (2017.01)
B33Y 50/00 (2015.01)
(52) U.S. Cl.
CPC .......... B29C 48/907 (2019.02); B29C 64/386 (2017.08); B33Y 80/00 (2014.12); B33Y 50/00 (2014.12)

(56) References Cited

U.S. PATENT DOCUMENTS

| | | | |
|---|---|---|---|
| 7,357,630 B2 | 4/2008 | Stieglitz | |
| 2003/0211657 A1* | 11/2003 | Williams | B33Y 40/00 257/E23.102 |
| 2006/0034965 A1* | 2/2006 | Ulrich | B29C 48/903 425/325 |
| 2006/0159796 A1* | 7/2006 | Schmuhl | B29C 48/07 425/325 |
| 2016/0305720 A1* | 10/2016 | Rhee | F28F 3/025 |

FOREIGN PATENT DOCUMENTS

| | | |
|---|---|---|
| DE | 102005002820 B3 | 5/2006 |
| DE | 10 2009 01610 A1 * | 10/2010 |
| DE | 10 2009 016100 A1 * | 10/2010 |
| DE | 102009016100 A1 | 10/2010 |
| WO | 2004103684 A1 | 12/2004 |

OTHER PUBLICATIONS

Isaza et al., "Additive Manufacturing with metal powders: Design for Manufacture evolves into Design for Function," Metal Additive Manufacturing, Summer 2014, 6 pages.
Preliminary Report on Patentability for International Application No. PCT/EP2020/053502 dated Jun. 11, 2021, 35 pages.

* cited by examiner

FIN BLOCK WITH CONTINUOUSLY VARIED FIN WIDTH

CROSS-REFERENCE TO RELATED APPLICATIONS

This is a National Stage application of PCT international application PCT/EP2020/053502 filed on Feb. 11, 2020, which claims the priority of German Patent Application No. 10 2019 002 008.1, filed Mar. 21, 2019, which are incorporated herein by reference in their entireties.

FIELD OF THE INVENTION

The invention relates to a fin block for a calibrating device for the calibrating of an extruded profile. The invention further relates to a method for the production of such a fin block, a system for the additive manufacture of such a fin block and a corresponding computer program and data set.

BACKGROUND OF THE INVENTION

Calibrating devices are used for the calibrating of extruded endless profiles, such as for example tube profiles. In the production of such profiles, firstly a desired plastic melt for the production of the profile is produced in an extruder. The produced plastic melt is then pressed through an outlet nozzle of the extruder, which prescribes the shape of the profile. The profile exiting the outlet nozzle of the extruder then passes through a calibrating device, which post-forms the still heated profile with dimensional accuracy.

Such a calibrating device for the dimensioning of extruded profiles is known from DE 198 43 340 C2. There, a variably adjustable calibrating device is taught, which is configured for the calibrating of extruded plastic tubes with different tube diameter. The calibrating device comprises a housing and a plurality of fin blocks arranged in a circular shape in the housing, which together form a calibration basket with a circular calibration opening through which the tubes which are to be calibrated are directed (cf. in particular FIGS. 1 and 2 of DE 198 43 340 C2). Furthermore, each fin block is coupled with an actuating device which is provided for the individual radial displacement of the respective fin block. In this way, the effective cross-section of the circular calibration opening, formed by the plurality of fin blocks, can be adjusted accordingly as required.

The fin blocks described in DE 198 43 340 C2 consist respectively of a plurality of fins which are strung on two carrier rods arranged spaced apart from one another. To maintain a desired distance between adjacent fins, spacer sleeves are used (cf. also FIG. 3 of DE 198 43 340 C2). An example of a strung fin block is further shown in FIG. 1. The fin block 10 illustrated in FIG. 1 comprises a plurality of fins 12 and spacer sleeves 14, which are strung alternately along two carrier rods 16. Such strung fin blocks are laborious to manufacture and therefore cost-intensive.

Figure 2A:
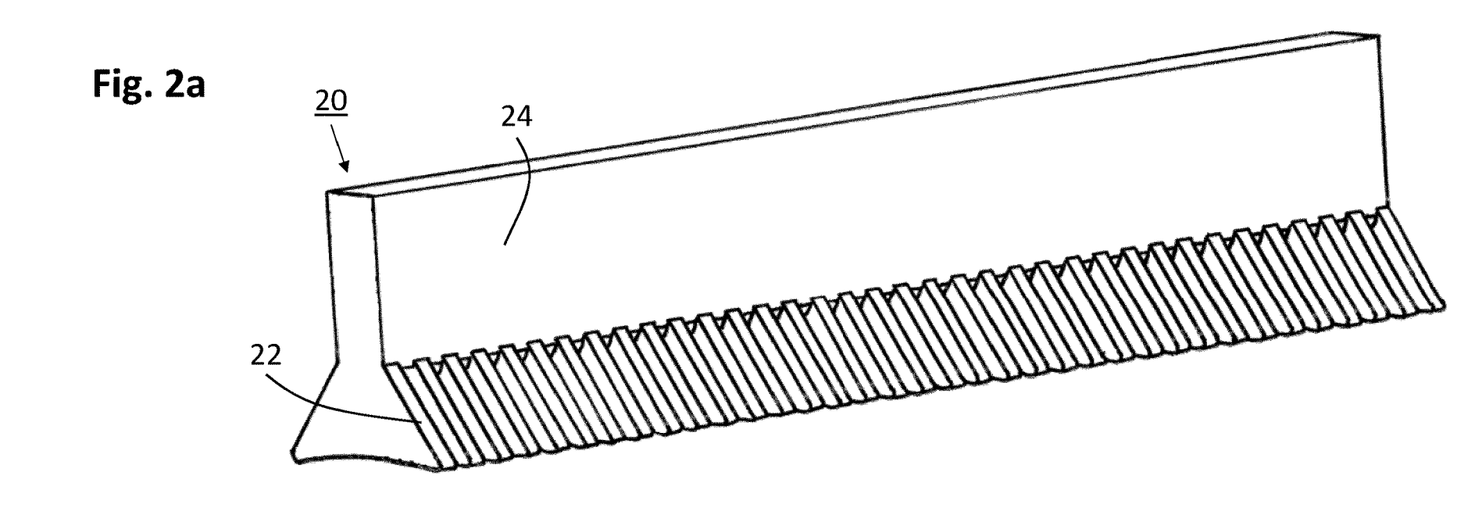
FIGS. 2*a*/2*b* views of a further fin block for a calibrating device according to the prior art.
Figure 2B:
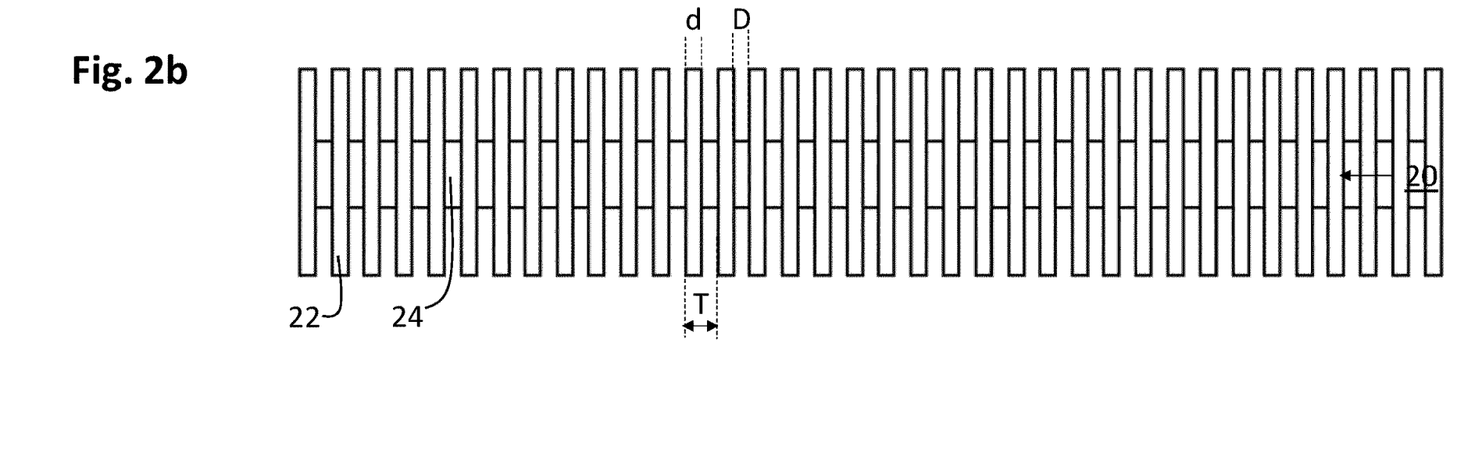

Differing from the strung fin blocks described above, furthermore fin blocks with closed carrier structures (or respectively back structures) are known. FIGS. 2a and 2b show an example of such a fin block. The fin block 20 comprises a plurality of fins 22, which are carried by a back structure 24 configured in a block shape (cf. 3D view in FIG. 2a). The block-shaped back structure 24 is realized here in the form of a solid body (e.g. bar-shaped body). Further examples of fin blocks with a closed back structure are known from WO 2004/103684 A1. Such fin blocks can be formed in one piece. They can be produced at a favourable cost by suitable processing methods (such as for example milling, cutting) from a material block. However, the use of a casting method is also conceivable in order to produce the fin block 20.

Figure 1:
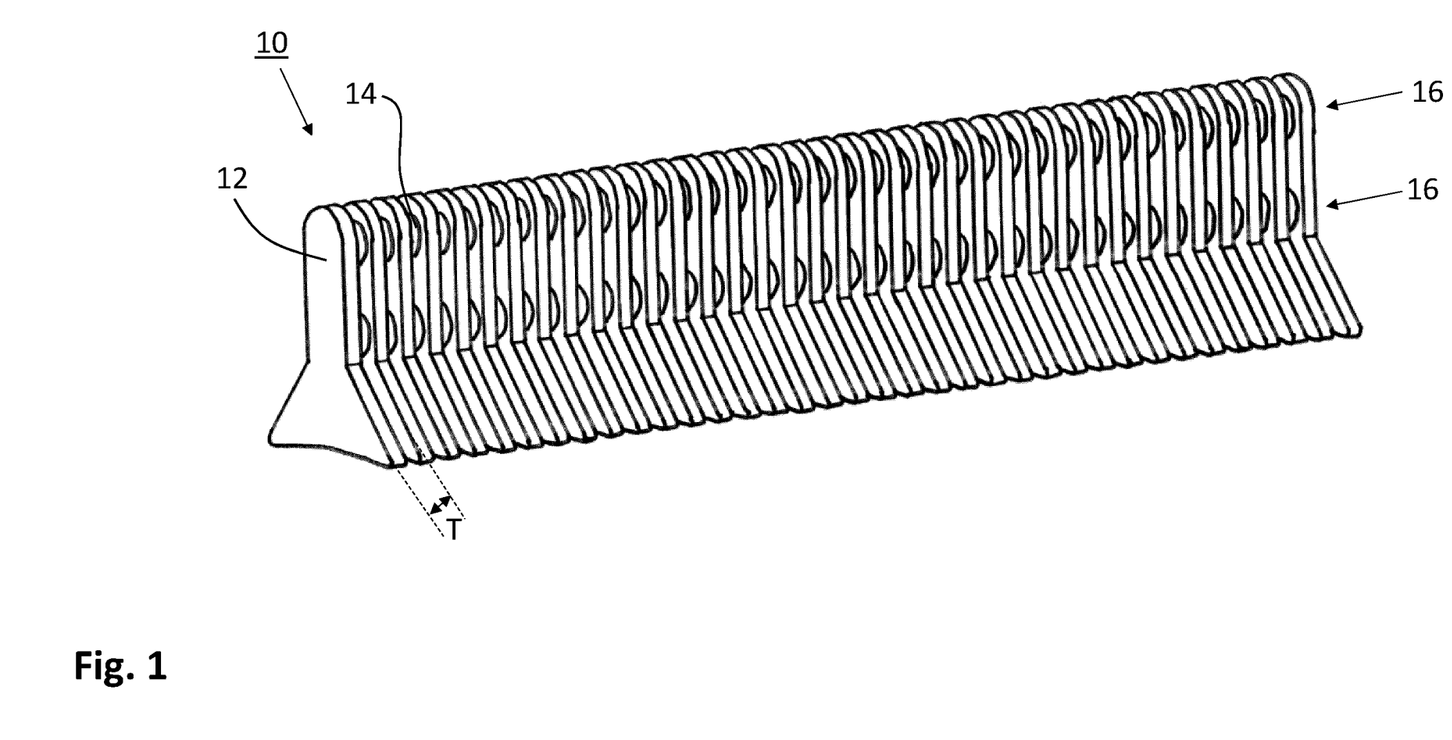
FIG. 1 a 3D view of a fin block for a calibrating device according to the prior art.

The fin blocks 10, 20 illustrated in FIGS. 1, 2a and 2b have in common that the fins 12, 22 and the spacing regions between the fins 12, 22 (also designated as grooves) have respectively a predefined constant width. Therefore, the fin structures of the fin blocks 10, 20, produced by the fins 12, 22 and grooves, have respectively a constant spacing T (periodicity) in longitudinal direction of the fin blocks 10, 20 (see FIGS. 1 and 2b). Spacing T is understood to mean here the smallest length within the fin structure after which the arrangement of the fins is repeated. The spacing T depends on the width d of the fins and the width D of the grooves within the fin structure and corresponds to the sum of the widths of a fin and its adjoining groove (therefore T=d+D).

In the case of the fin blocks with constant spacing described here, frequently a rattling is observed of the profiles which are to be calibrated when they are pushed through the calibration basket. The cause of the rattling is the bulge structure on the profile surface which occurs during the calibrating of the profile. This is because the plastic of the profile which is to be calibrated, which is still plastically deformable during the calibration process, is easily pressed into the grooves of the fin structure. Thereby, bulge areas (abbreviated as bulges) form on the surface of the profile which is to be calibrated, the dimensions of which bulge areas correspond to the dimensions of the grooves. Thus, a repeating bulge structure with the spacing T of the fin structure occurs on the surface of the profile which is to be calibrated. With the feed of the profile which is to be calibrated through the calibration basket of the calibrating device, already produced bulges on the profile surface "engage" into subsequent grooves of the fin blocks. The repeating engaging of the bulges into the grooves leads to the undesired rattling of the profile to be calibrated in the calibration basket. On the other hand, through the repeating impression of the fin structure on the profile surface, the bulge structure is intensified on the profile surface.

BRIEF SUMMARY OF THE INVENTION

DE 10 2009 016 100 A1 relates to a calibrating device for a system for the extrusion of plastic tubes, comprising calibrating tools which during the calibrating lie against the outer wall of the tube, wherein a plurality of segment-shaped calibrating tools are arranged distributed over the circumference of the tube which is to be calibrated, respectively with a distance of their centre points with respect to one another and respectively form a ring-shaped arrangement, and wherein, viewed in the production direction of the tube, a plurality of such ring-shaped arrangements are provided, wherein the individual tools of two ring-shaped arrangements, following one another in longitudinal direction, are respectively offset with respect to one another in circumferential direction, and the segment-shaped tools of the ring immediately following in longitudinal direction respectively engage into the gap between the tools of a ring and of the next-but-one ring, so that a toothed arrangement is produced. According to the invention, provision is made that the individual segment-shaped calibrating tools, extending in circumferential direction, are configured as hollow bodies and have slits in the region of their sliding surfaces, lying against the tube circumference, which slits are in connection with a cavity in the hollow body. Thereby, water or negative pressure can be put onto the tube surface via the slits.

DE 10 2005 002 820 B3 relates to a continuously adjustable calibrating sleeve for extruded plastic tubes, with an inlet head and two band layers which cross one another in the manner of an expanding lattice and are connected articulatedly with one another at the intersection points. Here, the inlet head and the band layers are adjustable to the tube diameter, and the inlet head has radially displaceable and overlapping segments arranged in a radial plane, distributed over the circumference of the plastic tube which is to be calibrated, which segments have slits in their overlapping regions and engage into one another in an interlocking manner. The front faces of the segments are configured for abutting onto the plastic tube which is to be calibrated, and the band layers are fastened in a flush manner with the front faces articulately on the segments. With such a calibrating sleeve, an effective sealing of the vacuum tank with respect to the environment is to be achieved, and buckling of the incoming, extruded plastic tube is to be prevented.

DE 103 15 125 B3 relates to a calibrating device for the calibrating of extruded endless profiles, in particular tubes, comprising a plurality of segment rings, consisting of individual segments, arranged on behind the other, the inner surface of which together form a calibrating opening, wherein segments lying one behind the other in axial direction are combined to a segment block, the individual segments of each segment block are arranged on a carrier structure, the segment blocks are received substantially in a circular manner in a housing in such a manner that axially adjacent segments in each position in circumferential direction partially overlap one another, and each carrier structure is connected with at least one mounting- and actuating device, by which the individual segment blocks, associated with a respective carrier structure, are held in the housing and an adjustment of each individual segment block is able to be carried out in radial direction. For easier installation and for easier mounting, it is proposed here that each mounting- and actuating device is constructed divided in two, wherein a first part is connected with the carrier structure, a second part is received in the housing, and both parts are connected with one another in a separable manner.

US 2003/211 657 A1 describes a cooling body which is manufactured stereolithographically. The cooling body has a heat transmission element which is configured so that it is arranged in the vicinity of a semiconductor device, in order to absorb heat from the semiconductor device during its use. The cooling body also has a heat dissipation element, which is configured in order to emit heat when air flows past a surface thereof. When stereolithographic methods are used, in order to produce the heat dissipation element of the cooling body, the heat dissipation element can have non-linear or winding passages, through which air can flow. As at least one part of the cooling body is produced stereolithographically, this part can have a series of cohesive layers of heat-conducting material, lying over one another, adhering to one another. The layers can be produced by consolidated selected regions of a layer of non-consolidated particulate or pulverulent material or by defining an object layer of a material layer. The stereolithographic method can comprise the use of an image processing system which comprises at least one camera which is operationally connected with a computer which controls a stereolithographic material application, so that the system can detect the position and alignment of a semiconductor device or of another substrate, on which the cooling body is situated.

It is an object of the present invention to provide fin blocks for a calibrating device which further reduce or respectively eliminate the problems indicated in connection with the prior art. In particular, it is an object of the present invention to improve the surface structure of the profile which is to be calibrated. Furthermore, the rattling of the profile to be calibrated, which is observed in connection with known calibration blocks, is to be at least reduced or respectively prevented entirely.

To solve the above-mentioned problem, according to a first aspect a fin block is provided for a calibrating device for calibrating an extruded profile. The fin block comprises a fin structure which has a plurality of fins which are spaced apart from one another by grooves and are arranged in longitudinal direction of the fin block, wherein the fins of the fin structure have a variable dimension in longitudinal direction of the fin block.

The extruded profile can be a plastic profile. The extruded plastic profile can be an endless profile, such as for example a tube profile.

Dimension in longitudinal direction of the fin block means the width of the fins. Consequently, variable dimension means a variable (therefore changing) fin width in longitudinal direction of the fin block.

The fin structure has a constant (therefore uniform) spacing in longitudinal direction of the fin block. The spacing of the fin structure in longitudinal direction of the fin block (therefore along the fin block) depends on the width of the fins and the width of the grooves. The spacing (spacing length) of the fin structure is composed of the width of a fin and the width of its adjoining groove. When the spacing of the fin structure remains constant, despite variable width of the fins in longitudinal direction, then the width of the grooves between the fins varies accordingly. Groove means the distance between two adjacent fins within the fin structure, as described in the introduction.

The dimension of the fins in longitudinal direction of the fin block can vary (change) continuously. Varying continuously can mean that successive fins of the fin structure have respectively different fin widths. The fin structure therefore does not have any regions in which successive fins have the same width. Rather, the width of the fins can vary within the fin structure from fin to fin.

According to a variant, the dimension of the fins can vary arbitrarily in longitudinal direction of the fin block. This means that the variation (change) of the fin widths along the fin structure does not follow any predefined pattern (functional relationship). Rather, the variation of the fin widths along the fin structure is random.

Alternatively to the random variation of the fin widths described above, the dimension of the fins (fin width) can vary in longitudinal direction of the fin block according to a predefined function. The function specifying the variation (change) of the fin width can be a constant function. For example, a function specifying the change of the fin width, in which the fin width increases continuously or decreases continuously along the fin structure from one fin structure end to the opposite fin structure end is conceivable. However, a variation (change) of the fin width is also conceivable according to a function in which the fin width firstly increases/decreases starting from a fin structure end, in order to subsequently decrease/increase again continuously up to reaching the opposite fin structure end.

Irrespective of the practical implementation, the function prescribing the variation of the fin width is to be selected in such a way that it has no periodicity along the fin structure. In this way, the formation of a periodic superstructure in the fin structure is prevented.

The fin block can have, furthermore, a carrier structure on which the fin structure is arranged. The carrier structure can comprise a block-shaped back structure which is configured to be beam-shaped. The block-shaped back structure can be provided, furthermore, with apertures in order to reduce the weight of the fin block.

The carrier structure can be formed in one piece with the fins or respectively with the fin structure. To achieve a one-piece configuration, the fin block can be produced by means of 3D printing. However, it is also conceivable that the fin block is manufactured by milling, drilling and/or cutting from a single workpiece. Alternatively, the fin structure or respectively the fins and the carrier structure can be manufactured respectively separately. The fin structure (or respectively the fins) can then be connected with the carrier structure accordingly.

The carrier structure and the fins can be made from the same material or from different materials. According to a variant, the material from which the carrier structure and/or the fins are made can be made from a metallic material. However, the use of a polymer material (with additives) is also conceivable.

According to a further aspect of the invention, a calibrating device is provided for the calibrating of extruded plastic profiles, wherein the calibrating device has a plurality of the fin blocks according to the invention, which are arranged with respect to one another for the formation of a calibration opening. The arrangement of the fin blocks here can be in such a way here that they form a circular calibration opening.

The calibration opening can comprise, furthermore, a plurality of actuating devices, wherein each actuating device is coupled respectively with a fin block. Each fin block can be actuated individually radially to the calibration opening by the actuating device. Thereby, the effective cross-section of the calibration opening can be adapted as required to the cross-section (diameter) of the profile which is to be calibrated.

Furthermore, the calibrating device can have a housing which is provided for receiving and mounting the actuating devices and the fin blocks which are coupled with the actuating devices.

According to a further aspect of the invention, a method is provided for producing a fin block as described above. The method for producing the fin block comprises at least the step of producing the fin block by means of 3D printing or by means of an additive manufacturing method. The production of the fin block by means of 3D printing method or additive manufacturing method can comprise here a layered laser sintering/laser melting of material layers, wherein the material layers are applied one after another (sequentially) according to the shape of the fin block which is to be produced.

The method can further comprise the step of calculating a fin block geometry (CAD Data) and, optionally, the converting of the 3D geometry data into corresponding control commands for the 3D printing or the additive manufacture.

According to a further aspect, a method is provided for producing a fin block which comprises the steps: developing a data set which represents the fin block as described above; and storing the data set on a memory device or a server. The method can further comprise: inputting the data set into a processing device or a computer, which actuates a device for additive manufacture in such a way that it manufactures the fin block represented in the data set.

According to a further aspect, a system is provided for additive manufacture of a fin block, with a data generating device for generating a data set, which represents the fin block as described above, a memory device for storing the data set, and a processing device for receiving the data set and for actuating a device for additive manufacture in such a way that it manufactures the fin block represented in the data set. The memory device can be a USB stick, a CD ROM, a DVD, a memory card or a hard disk. The processing device can be a computer, a server or a processor.

According to a further aspect, a computer program or respectively computer program product is provided, comprising data sets which with the reading of the data sets by a processing device or a computer causes it to actuate a device for additive manufacture in such a way that the device for additive manufacture manufactures the fin block as described above.

According to a further aspect, a machine-readable data carrier is provided, on which the computer program, described above, is stored. The machine-readable data carrier can be a USB stick, a CD ROM, a DVD, a memory card or a hard disk.

According to a further aspect, a data set is provided which represents the fin block as described above. The data set can be stored on a machine-readable data carrier.

BRIEF DESCRIPTION OF THE DRAWINGS

Further advantages, details and aspects of the present invention are discussed with the aid of the following drawings. There are shown.

DESCRIPTION OF EXAMPLE EMBODIMENTS

FIGS. 1, 2*a* and 2*b* were already discussed in the introduction in connection with the prior art. Reference is to be made to the description there.

Figure 3:
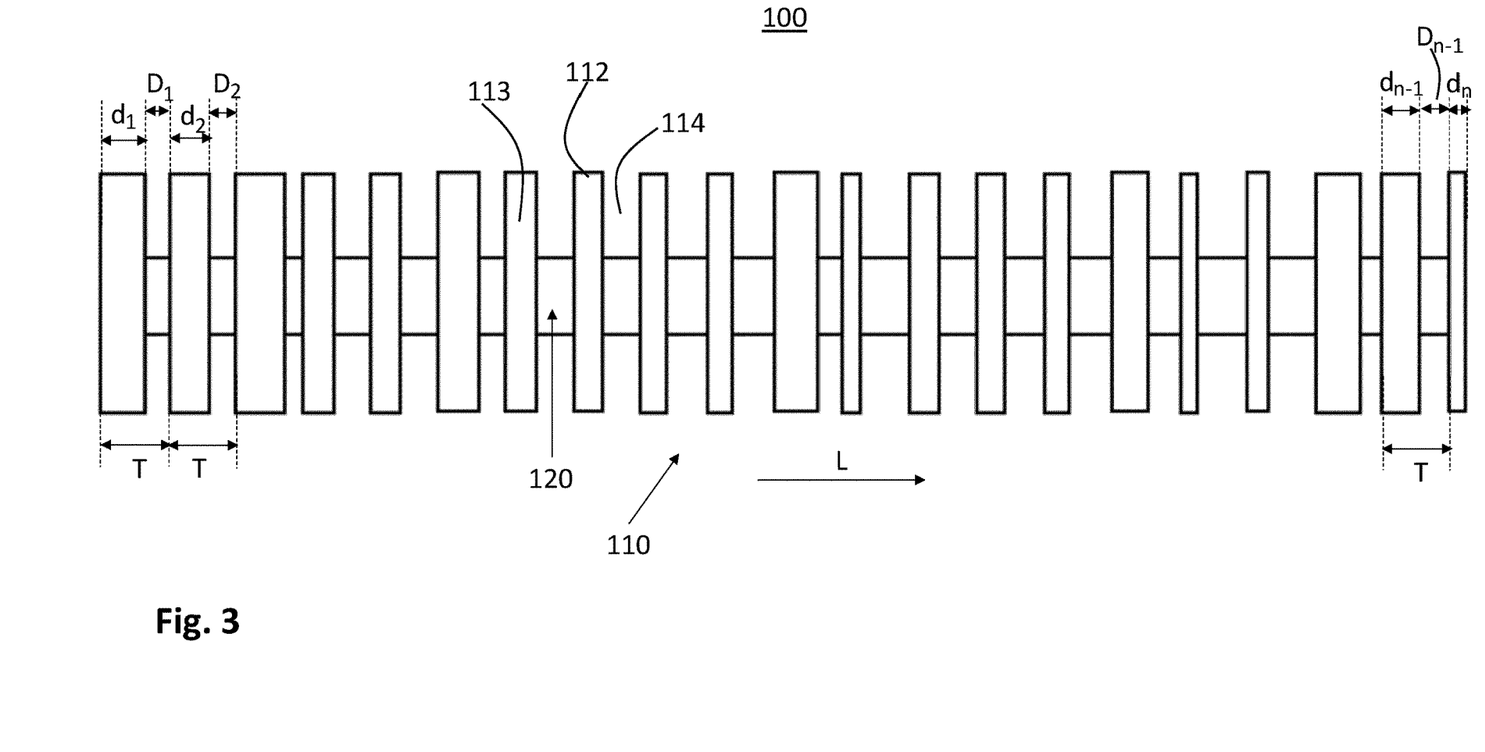
FIG. 3 a view of a fin block according to the present invention.

In connection with FIG. 3, a fin block 100 according to the invention for a calibrating device is now described further. FIG. 3 shows a view onto an inner side of the fin block 100. Inner side designates the side of the fin block 100 which faces a profile which is to be calibrated.

The fin block 100 comprises a fin structure 110 which comprises a plurality of fins 112 and grooves 114 which separate adjacent fins 112 from one another. By grooves 114, consequently, the free spaces (distances) between successive fins 112 are designated. In the view shown in FIG. 3, each individual fin 112 of the fin structure 110 is illustrated in the form of a crossbeam. The fin block 100 further comprises a carrier structure 120 to receive (mount) the fins 112 (or respectively fin structure 110). The carrier structure 120, along which the fins 112 are arranged, is indicated in FIG. 3 as a longitudinal beam (horizontal beam).

The carrier structure 120 can have a back structure configured in a block-shaped manner. The back structure can be realized by a beam-shaped body, along which the fins 112 are arranged. In particular, the beam-shaped back structure can have apertures to reduce the weight. Therefore, the carrier structure 120 can be configured precisely as the carrier structure of the fin block 20 described in connection with FIGS. 2a and 2b. Reference is to be made to the corresponding description of FIGS. 2a and 2b. Alternatively, the carrier structure 120 can have at least one carrier rod on which the fins 112 are strung, as described in the introduction in connection with the fin block in FIG. 1. The distance (grooves) between successive fins 112 is realized in the strung fin block by means of spacer sleeves of suitable length.

The fins 112 of the fin structure 110 have respectively a predefined cross-section profile perpendicularly to the longitudinal direction L of the fin block 100 (not seen in the view in FIG. 3). The cross-section profile of each fin 112 can correspond here to the cross-section profile in the fins shown in FIG. 1 or 2a (therefore can realize an approximately triangular cross-section profile). Each fin 112 has, furthermore, a fin surface 113 facing the profile which is to be calibrated. The fin surfaces 113 of the fins 112 form a contact surface with which the profile which is to be calibrated comes in contact. The fin surface 113 facing the profile which is to be calibrated can be configured to be flat or can have a curved surface.

The fins 112 of the fin structure 110 are configured in such a way that the fins 112 have variable widths d in longitudinal direction L of the fin block 100. At the same time, the fin structure in longitudinal direction L of the fin block 100 has a predefined, constant spacing T. Spacing T (or respectively spacing length) means here the length of the base unit forming the fin structure 110, which consists of a fin 112 and its adjoining groove 114. The spacing T of the fin structure is therefore composed of the width d of a fin 112 and the width D of its adjoining groove 114, therefore T=d+D. As the spacing T remains constant along the fin structure 110, the width D of the grooves 114 varies according to the changing fin widths d. In other words, the fin structure 110 comprises fins 112 with variable fin width d and variable groove width D in such a way that the spacing T along the fin structure 110 has a fixedly predefined, constant value.

The fin structure 110 shown in FIG. 3 has a number of n fins 112 arranged in longitudinal direction L of the fin block 100 (n is an arbitrary natural number). Each of the n fins 112 has a predefined fin width $d_i$ (i=1, n, wherein n is a natural number and reflects the number of fins 112 in the fin structure 110), wherein the fin widths $d_1, d_2, \ldots d_n$ vary continuously in longitudinal direction L of the fin block 100. Continuous variation of the fin widths $d_1, d_2, \ldots d_n$ means that respectively adjacent fins 112 have different fin widths $d_1, d_2, \ldots d_n$ within the fin structure 110. The fin structure 110 therefore has no regions within which the width $d_1, d_2, \ldots d_n$ of adjacent fins 112 is constant.

As can be seen further from FIG. 3, the variation of the fin widths $d_1, d_2, \ldots d_n$ along the fin structure 110 is selected arbitrarily. In other words, the variation of the fin widths $d_1, d_2, \ldots d_n$ in longitudinal direction L does not follow a predefined pattern (functional relationship). In particular, the fins 112 with the variable fin widths are arranged within the fin structure 110 in such a way that the fin structure 110 has no periodicity. Rather, the fins alternate with larger and smaller widths, wherein the widths of the individual fins can be selected arbitrarily.

Figure 4:
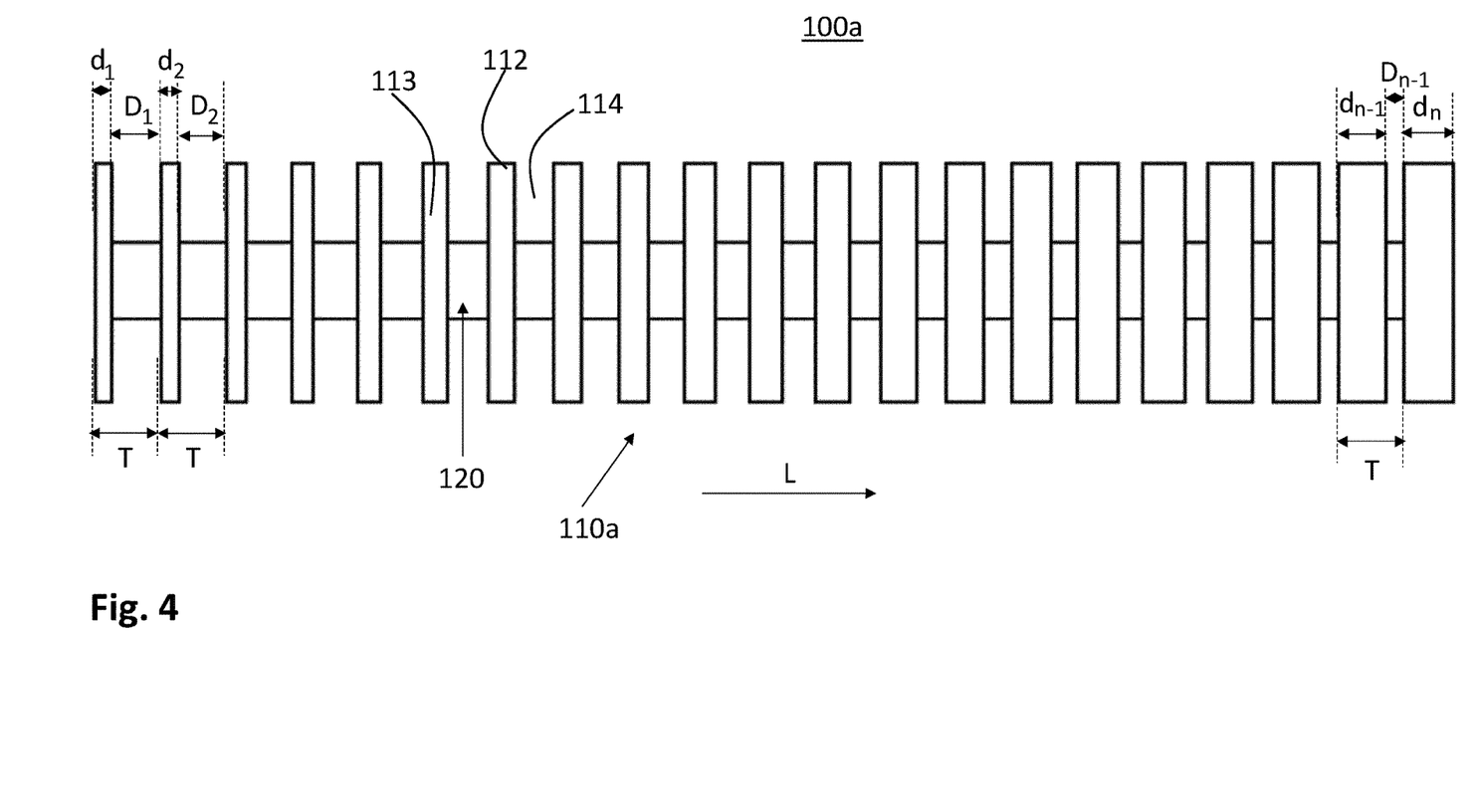
FIG. 4 a view of a further fin block according to the present invention.

In connection with FIG. 4, a further fin block 100a according to the present invention is described. The fin block 100a has again a fin structure 110a with a plurality of fins 112 arranged spaced apart from one another. Furthermore, the fin block 100a has a fin carrier 120 carrying the fin structure 110a. The fin carrier 120 and fins 112 can be configured precisely as in the fin block 100 of FIG. 3. In particular, the fins 112 of the fin structure 110 have again a predefined, constant spacing T. For simplification, the fin carrier 110 and the fins 122 are given the same reference numbers as in the fin block 100 in FIG. 3. Furthermore, reference is to be made to the corresponding description of the fins 112 and of the fin carrier 110 in connection with FIG. 3 further above.

The difference between the fin block 100 in FIG. 3 and the fin block 100a in FIG. 4 consists in the configuration of the fin structure 110a. As in the fin structure 100 in FIG. 3, the fin structure 110a has a predefined, constant spacing T. However, the width $d_i$ (with i=1, n, wherein n is a natural number) of the fins 112 varies continuously in longitudinal direction L of the fin block 100a. Therefore, the widths a (with i=1, n, wherein n is a natural number) of the grooves 114 also vary in longitudinal direction L. However, the continuous variation of the fin widths $d_i$ (and therefore of the groove widths $D_i$) in longitudinal direction L is not arbitrary, but rather follows a constant function.

According to the implementation shown in FIG. 4, the widths $d_i$ of the fins (and the widths a of the grooves 114) vary in longitudinal direction L of the fin structure 110a according to a linearly increasing (decreasing) function. Proceeding from a first end of the fin structure 110a (left end in FIG. 4), the width of the fins $d_1, d_2, \ldots d_n$ increases linearly up to a second end of the fin structure 110a (right end in FIG. 4). It shall be understood that the linear increase of the fin widths $d_1, d_2, \ldots d_n$ which is described here is only by way of example and a different functional variation of the fin widths $d_1, d_2, \ldots d_n$ is equally conceivable. It is only critical that the variation of the fin widths $d_1, d_2, \ldots d_n$ is such that no regions of constant width occur within the fin structure 110a.

Through the continuous variation of the fin widths described in connection with FIGS. 3 and 4, with maintaining of a constant spacing along the fin structure 110, it is prevented that the bulges (caused by the fin structure itself) occurring during calibrating on the surface of the profile which is to be calibrated, with the feed of the profile which is to be calibrated through the calibration basket fall again and again into subsequent grooves of the fin blocks. Through the different position and size of the grooves (and therefore of the bulges on the surface of the profile which is to be calibrated), it is effectively prevented that bulges can fall into successive grooves.

Figure 5:
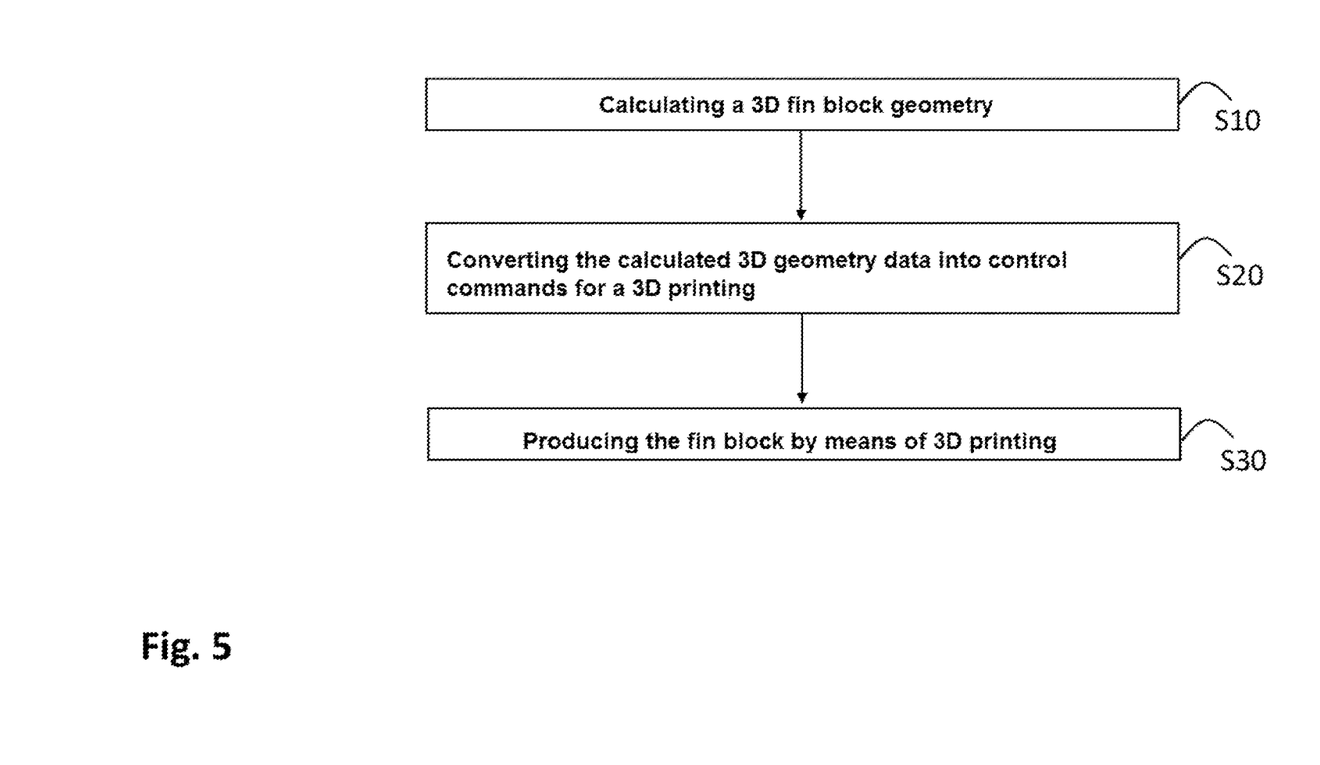
FIG. 5 a block diagram of a method for producing the fin blocks described in FIGS. 3 and 4.

For the production of the fin blocks 100, 100a illustrated in FIGS. 3 and 4, a generative or respectively additive manufacturing method can be used. Such a production method is shown in FIG. 5. Here, in a first step S10, 3D geometry data (CAD data) are calculated for the fin block 100, 100a. The 3D geometry data describe the geometry of the entire fin block 100, 100a comprising the carrier structure 110 and the fin structure 110, 110a. In a subsequent second step S20, the calculated 3D geometry data are converted into control commands for a 3D printing. Based on the generated control commands, the fin block 100 is then built up (in its entirety) in a layered manner by means of a 3D printing method (e.g. laser sintering, laser melting) (step S30). A metallic material or a polymer material can be used as material for the 3D printing.

Alternatively to the production by means of 3D printing described here, it is also conceivable that the fin blocks 100, 100a are produced from a workpiece (for example by milling, drilling, cutting) or by means of a casting method.

Figure 6:
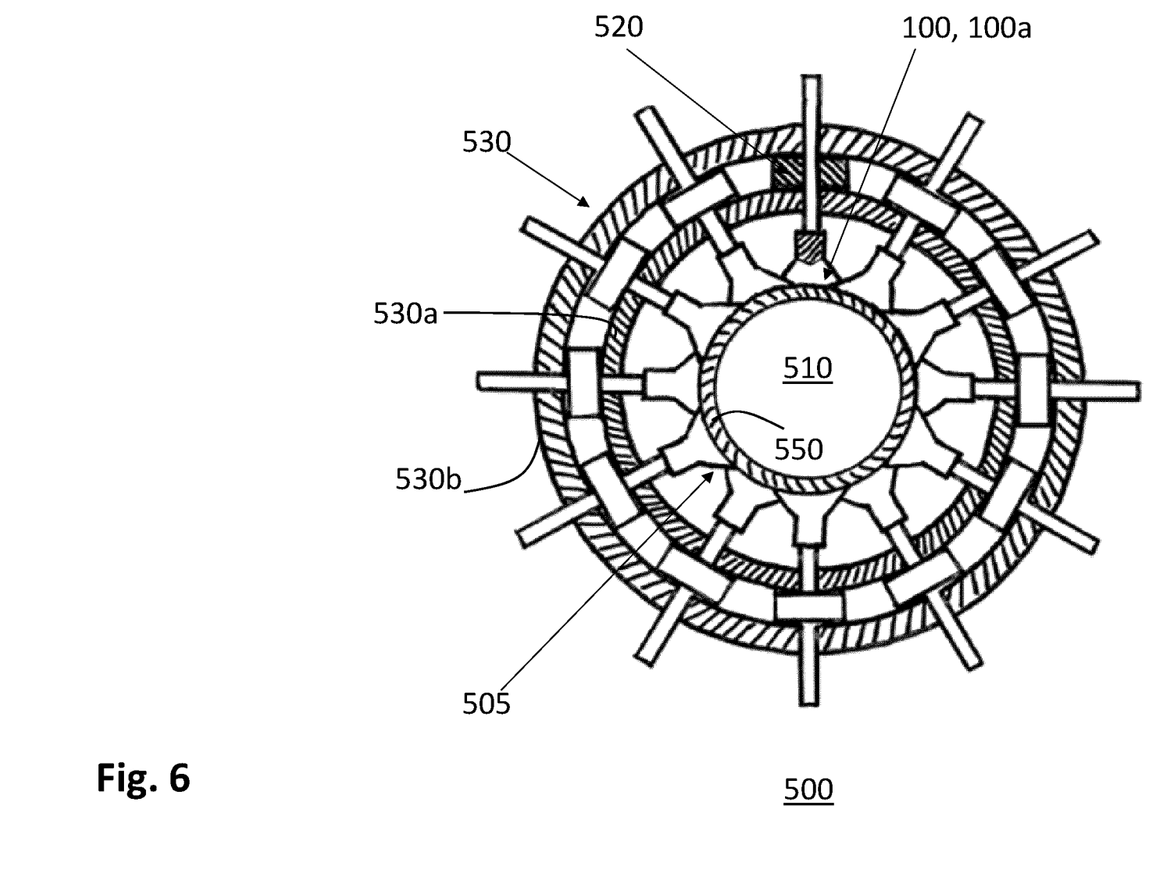
FIG. 6 a calibrating device according to the present invention.

In connection with FIG. 6, a calibrating device 500 for calibrating an extruded plastic profile 550 is described. FIG. 6 shows a sectional view of the calibrating device 500. In the implementation shown in FIG. 6, the profile 550 which is to be calibrated is a tube profile.

The calibrating device 500 comprises a plurality of the fin blocks 100, 100a according to the invention described above, which are arranged with respect to one another in circumferential direction of the calibrating device 500 in such a way that they form a calibration basket 505 with a desired calibration opening 510. As indicated in FIG. 6, the adjacent fin blocks 100, 100a can be arranged engaging into one another. For this, the fins 112 and grooves 114 of adjacent fin blocks 100, 100a are coordinated with one another in their arrangement and dimension (in particular in the groove width and fin width) in such a way that fins 112 of fin blocks 100, 100a arranged adjacently can engage into one another in a comb-like manner.

Furthermore, the calibrating device 500 comprises a plurality of actuating devices 520 (for example linear actuators), wherein respectively an actuating device 520 is coupled with a fin block 100, 100a. The actuating devices 520 are provided to displace the respective fin blocks 100, 100a in radial direction (therefore perpendicularly to the feed direction of the profile which is to be calibrated). Thereby, the effective cross-section of the calibration opening 510 can be adapted accordingly to the profile 550 which is to be calibrated.

The calibrating device 500 further comprises a housing 530 for receiving the actuating devices 520 and the fin blocks 100, 100a. The housing 530 can be configured in a cylindrical shape. It can have an inner housing cylinder 530a and an outer housing cylinder 530b, wherein components of the actuating device 520 can be arranged in the intermediate space between the inner housing cylinder 530a and the outer housing cylinder 530b, similarly to the calibrating device described in DE 198 43 340 C2.

Through the fin blocks described here with continuously varied fin width (and groove width), it is prevented that a periodic bulge pattern forms on the profile surface of the profile which is to be extruded. As the bulge pattern is formed irregularly, it is prevented that produced bulges in the feed of the extruded profile fall into subsequent grooves of the fin blocks. Therefore the rattling, described in the introduction, during a calibration process is prevented. Furthermore, the surface structure of the extruded profile is improved, because through the changing fin widths (and groove widths) within the fin structure, a repeated impressing of the fin structure at the same positions on the profile surface is prevented.

What is claimed is:

1. A fin block for a calibrating device for the calibrating of an extruded profile, wherein the fin block comprises a fin structure having a plurality of fins including first, second, and third fins arranged in succession along a longitudinal direction of the fin block, wherein the first fin is spaced from the second fin by a first groove, and the second fin is spaced from the third fin by a second groove, wherein a first distance collectively spans respective widths of the first fin and the first groove in the longitudinal direction, and a second distance collectively spans respective widths of the second fin and the second groove in the longitudinal direction, wherein the width of the first fin and the width of the second fin are different, and wherein the first distance is equal to the second distance.

2. The fin block according to claim 1, wherein respective widths of the plurality of fins vary continuously with respect to one another in the longitudinal direction.

3. The fin block according to claim 1, wherein respective widths of the plurality of fins vary arbitrarily with respect to one another in the longitudinal direction of the fin block.

4. The fin block according to claim 1, wherein respective widths of the plurality of fins vary with respect to one another in the longitudinal direction of the fin block according to a predefined function.

5. The fin block according to claim 1, further comprising a carrier structure on which the fin structure is arranged.

6. The fin block according to claim 5, wherein the carrier structure and the fin structure are made from the same material or from different materials.

7. The fin block according to claim 1, wherein the fin block is formed in one piece.

8. The fin block according to claim 1, wherein the fin block is produced by means of 3D printing or respectively by means of an additive manufacturing method.

9. A calibrating device for the calibrating of extruded profiles, comprising a plurality of fin blocks according to claim 1, wherein the plurality of fin blocks are arranged with respect to one another for the formation of a calibration opening.

10. The calibrating device according to claim 9, further comprising a plurality of actuating devices, wherein each actuating device is coupled respectively with a corresponding fin block of the plurality of fin blocks, in order to actuate each fin block individually.

11. A method for producing a fin block according to claim 1, comprising the step of producing the fin block by means of 3D printing or respectively by means of additive manufacture.

12. The method according to claim 11, further comprising the step of calculating a 3D fin block geometry, and of converting the calculated 3D geometry data into corresponding control commands for the 3D printing or respectively the additive manufacture.

13. A method for producing a fin block, comprising the steps:
developing a data set which represents the fin block according to claim 1;
storing the data set on a memory device or a server; and
inputting the data set into a processing device or a computer, which actuates a device for additive manufacture in such a way that it manufactures the fin block represented in the data set.

14. A non-transitory computer readable storage medium having data sets stored therein representing software executable by a processing device or a computer, the software including instructions to actuate a device for additive manufacture in such way that the device for additive manufacture manufactures the fin block according to claim 1.

* * * * *